United States Patent [19]

Surie

[11] Patent Number: 4,943,789
[45] Date of Patent: Jul. 24, 1990

[54] AUTOMATIC EQUALIZER FOR DIGITAL TRANSMISSION

[75] Inventor: Serge Surie, L'Hay les Roses, France

[73] Assignee: Societe Anonyme dite Alcatel CIT, Paris, France

[21] Appl. No.: 175,421

[22] Filed: Mar. 30, 1988

[30] Foreign Application Priority Data

Mar. 31, 1987 [FR] France .................................. 87 04477

[51] Int. Cl.$^5$ ........................................... H04B 3/14
[52] U.S. Cl. ......................................... 333/18; 375/12
[58] Field of Search ........................... 333/18; 330/304; 375/11, 12

[56] References Cited

U.S. PATENT DOCUMENTS

| | | | |
|---|---|---|---|
| 3,573,667 | 4/1971 | Kao et al. | 333/18 |
| 4,061,970 | 12/1977 | Magneron | 333/18 X |
| 4,243,956 | 1/1981 | Lemoussu et al. | 333/18 |
| 4,352,190 | 9/1982 | Hullwegen | 333/18 X |
| 4,488,126 | 12/1984 | Suthers | 333/18 |

FOREIGN PATENT DOCUMENTS

| | | | |
|---|---|---|---|
| 180065 | 5/1986 | European Pat. Off. | 375/12 |
| 2043144 | 3/1972 | Fed. Rep. of Germany . | |

OTHER PUBLICATIONS

Patent Abstracts of Japan, vol. 10, No. 27 (E-378) (2084), Feb. 4, 1986; and JP-A-60 186 130 (Nippon Denshin Denwa Kosha) 9/21/1985.

Patent Abstracts of Japan, vol. 11, No. 117 (E-498) (2564), Apr. 11, 1987; and JP-A-61 264 925 (Matsushita Electric Ind. Co. LTD) 11/22/1986.

Primary Examiner—Eugene R. LaRoche
Assistant Examiner—Benny Lee
Attorney, Agent, or Firm—Sughrue, Mion, Zinn, Macpeak & Seas

[57] ABSTRACT

This automatic equalizer comprises an automatic gain control circuit (2, 4) tending to keep the peak amplitude of the equalized signal constant, together with a variable equalization network (1) provided with a control input enabling the slope of its gain transfer characteristic to be modified without altering the value of its gain at the half Baud frequency, and a servo-control system for controlling the shaping of the frequency spectrum by controlling said variable equalization network, said servo-control system including a circuit (6) for detecting the mean phase error of zero crossings in the skirts of pulses appearing in the received and equalized digital transmission signal compared with the middles of Baud intervals.

7 Claims, 3 Drawing Sheets

AUTOMATIC EQUALIZER FOR DIGITAL TRANSMISSION

The present invention relates to data transmission and more particularly to equalizing transmission cables in order to compensate for the linear distortion to which they subject the digital signals they transmit, such distortion gives rise to attenuation and interference between signal elements that impede recognition.

BACKGROUND OF THE INVENTION

Equalization consists in linearly filtering the transmitted signal in order to obtain a transmission path whose overall response is flat in amplitude and linear in phase even though the path makes use of transmission cables whose attenuation is proportional to cable length and to the square root of the transmitted signal frequency, with different coefficients depending on the structures of the cables.

Equalization is automatic if the linear filter used for equalization purposes is provided with variable components which are adjusted by a servo-control system responsive to modifications in the characteristic of the transmitted signal so as to adapt the gain transfer characteristic of the filter to the real attenuation of the section of cable used, said adaptation generally being an adaptation in length, i.e. a compensation for variation in the attenuation characteristic of a cable of a kind that can be considered as being due to variations in the length of the cable.

Most prior automatic equalizers in use for base band data transmission are adjusted by means of a peak amplitude detector, thereby providing automatic gain control. Examples are described in French Pat. Nos. 2 128 152 and 1 603 582 (equivalent U.S. Pat. No. 3,568,100). These circuits are designed for use with coaxial cables of constant structure along their entire length, and their performance is greatly reduced when used in the public switched telephone network (PSTN) where a link can be made up from several successive lengths of pairs having different gauges.

One attempt at solving this problem seeks to make use of a criterion which is more representative of variations in the attenuation characteristic of a cable as a function of frequency, such criterion is based on the regularity of the zero crossings in the transmitted digital signal. An implementation is described in French Pat. No. 2 419 618 (equivalent U.S. Pat. No. 4,243,956) making use of a sign coincidence autocorrelator which operates on two mutually delayed versions of the transmitted and equalized digital signal. This new criterion considerably improves the quality of the equalization, but suffers from the drawback of requiring, in its preferred implementation, a pre-distortion filter placed at the input to the sign coincidence autocorrelator, thereby limiting the range over which the automatic equalizer can adapt automatically.

The object of the present invention is to provide an automatic equalizer for synchronous digital transmission, said equalizer having a wide range over which it can adapt automatically and being usable in the PSTN.

SUMMARY OF THE INVENTION

The present invention provides an automatic equalizer for synchronous digital transmission, the equalizer comprising an automatic gain control circuit tending to maintain the peak amplitude of the equalized digital transmission signal constant, the equalizer further comprising a variable equalization network provided with a control input enabling the slope of its gain transfer characteristic in the frequency range occupied by the digital transmission signal to be modified without modifying the value of the gain at the half Baud frequency of said digital transmission signal, and mean phase error detection means for detecting the mean phase error in the zero crossings of the skirts of pulses appearing in the received and equalized synchronous digital signal relative to the middles of the Baud intervals in the digital transmission signal, said detection means controlling the variable equalization network in such a manner as to increase the slope of its gain transfer characteristic on detecting a phase delay and to reduce said slope when detecting a phase advance.

The variable equalization network is advantageously constituted by a half-T filter cell containing a variable resistance in its series branch between its input and its output, and containing a parallel oscillator circuit in its branch in parallel with its output, said oscillator circuit being tuned to the top half of the band occupied by the synchronous digital transmission signal, between one half of its Baud frequency and its Baud frequency.

Advantageously, the mean phase error detection means comprise selector means for selecting those Baud intervals in the received digital transmission signal which are themselves empty of any pulse and which are immediately preceded by a Baud interval occupied by a pulse and, sampling means operating on said digital transmission signal in the middles of said empty Baud intervals.

BRIEF DESCRIPTION OF THE DRAWINGS

An embodiment of the invention is described by way of example with reference to the accompanying drawings, in which.

DETAILED DESCRIPTION

The automatic equalizer described below is intended for equalizing a line in the PSTN for transmitting a bipolar encoded synchronous digital signal in base band, with raised cosine shaping and occupying a frequency band whose high end is limited to the Baud frequency and having the major part of its components situated in a frequency range lying below the half Baud frequency.

Figure 1:
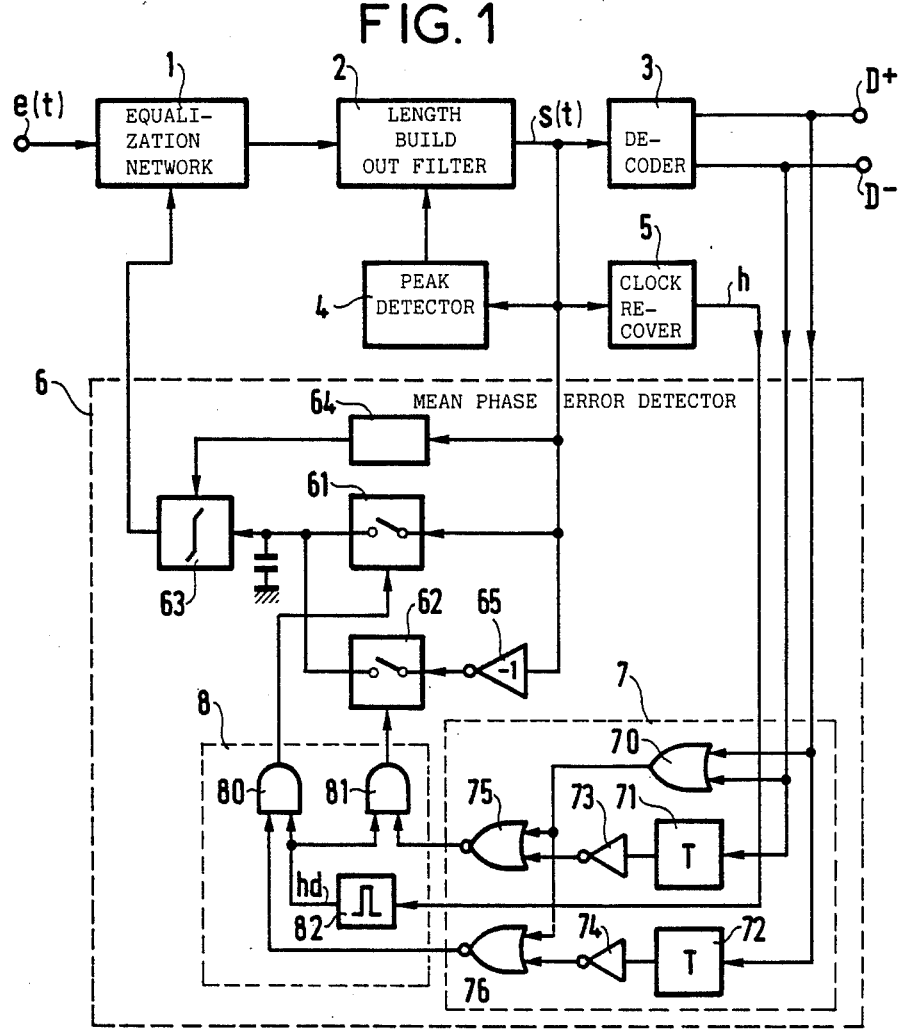
FIG. 1 is a circuit diagram of an automatic equalizer in accordance with the invention suitable for use with a bipolar encoded digital transmission signal.

As shown in FIG. 1, it comprises a circuit in two successive portions for filtering the received digital signal. These portions comprise: a variable equalization network 1 and a variable length build out filter 2. The two-portion filter circuit is controlled by two separate servo-control loops, one of which provides automatic gain control and acts on the variable length build out filter 2, and the other of which performs spectrum shaping by acting on the adjustment of the variable network 1 without influencing the variable length build out filter 2.

The variable equalization network 1 serves to modify the amplitude ratio between the low and the high frequency components in the received digital signal e(t) in the frequency range lying below the half Baud frequency and in which the major portion of the signal components lie. It is designed so that its adjustment has no, or very little, effect on the amplitude of the through signal, i.e. on the amplitude of the signal component at the half Baud frequency, thereby having no influence on the adjustment of the variable length build out filter 2 and eliminating beat phenomena due to the two servo-control loops latching onto each other. In a manner of speaking, it serves to equalize a family of standard maximum length lines each of which provides the same attenuation to the peak amplitude of the transmitted digital signal.

Figure 2:
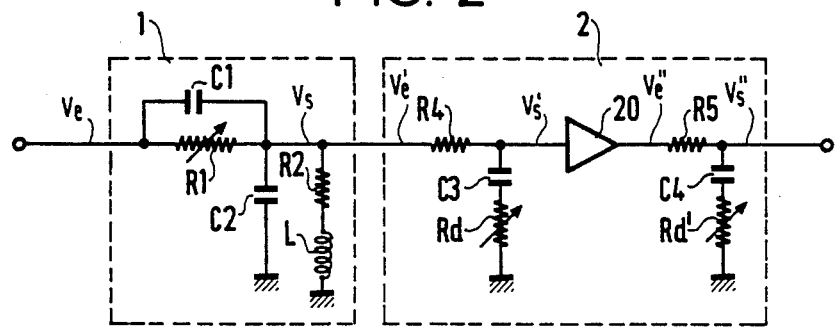
FIG. 2 shows a detail of a variable equalization network and of a variable cable length build out filter used in the automatic equalizer circuit shown in FIG. 1.

As shown in FIG. 2, the network comprises a half-T filter cell mainly constituted by a variable resistance R1 in its series branch between its input and its output, and by a wavetrap circuit constituted by a parallel-connected inductance L and a capacitance C2 located in its branch which is in parallel with its output between its output and a reference level, said wavetrap being tuned to a frequency lying between the half Baud frequency and the Baud frequency. The complex transfer gain of this cell, i.e. the ratio between its output voltage Vs divided by its input voltage Ve is given by the relationship:

$$\frac{V_s}{V_e} = \frac{(1/R1)}{(1/R1) + C2p + (1/Lp)} = \frac{p}{R1C2p^2 + p + (R1/L)}$$

and the modulus of this complex gain for p equal to jw, where w is the angular frequency and j is a complex number such that $j^2 = -1$, is given by:

$$\frac{w}{\sqrt{[(R1/L) - R1C2w^2]^2 + w^2}}$$

The gain transfer characteristic of this cell, which represents variations as a function of the frequency of:

$$20 \log \frac{w}{\sqrt{[(R1/L) - R1C2w^2]^2 + w^2}}$$

i.e. a magnitude proportional to the logarithm of said modulus of the complex gain, passes through a maximum equal to 0 dB regardless of the value of the resistance R1 at the resonant frequency f0:

$$f0 = \frac{w0}{2\pi} = \frac{1}{2\pi} \frac{1}{\sqrt{LC2}}$$

It has a positive slope and is an increasing function of R1 at frequencies less than F0 and it has a negative slope and is a decreasing function of R1 at frequencies greater than F0.

Given the position of the tuning frequency relative to the Baud frequency, the useful portion of this gain transfer characteristic is reduced substantially to the lefthand portion of the curve whose peak situated in the top half of the useful band in the vicinity of the half Baud frequency is little changed by a change in the value of the resistance R1 and whose positive slope in the range below the half Baud frequency varies within said range as a function of the value of the resistance R1 and in the same direction as said value, and approximates to variation which is proportional to the square root of the frequency.

The half-T cell of the variable equalization network 1 may further include, as shown, a resistance R2 interposed in series with the inductance L in order to provide a bottom limit to the relative bandwidth of the cell, and a capacitance C1 connected in parallel with all or a portion of the variable resistance R1 in order to deform the gain transfer characteristic asymmetrically and displace its peak towards the high frequency end in order to obtain, within said useful band, a better approximation to variation which is proportional to the square root of the frequency of the gain expressed in decibels.

The exact values for the various components of the half-T cell in the variable equalization network 1 depend on conditions of use. They are determined by making use of well-known filter synthesis techniques on the basis of a family of example transfer gain curves for maximum length standard lines.

The length build out filter 2 has the function of bringing up the length of the line actually used, as seen from the electrical point of view, to the maximum length for which the family of example curves was established. In practice, it causes the peak amplitude of the received digital signal to have a constant value which is independent of the length of the line actually used under conditions which are similar from the electrical point of view to those which would be obtained if a maximum length of line were being used. It behaves like a line of adjustable length having a transfer gain expressed in decibels which varies approximately proportionally with the inverse of the square root of the frequency.

It may be constituted, as shown in FIG. 2, by means of two successive half-T cells which are separated by a separating amplifier 20, and each of which acts on a portion of the frequency band occupied by the digital signal. Each of these cells includes a resistance R4 or R5 in its series branch between its input and its output, and a capacitance C3 or C4 connected in series with a variable resistance Rd or Rd' in its branch which is parallel with its output. The complex gains, thereof, i.e. the ratios of their output voltages Vs' or Vs'' divided by their input voltages Ve' or Ve'' have the same form and are expressed for one of them by the relationship:

$$\frac{V_{s'}}{V_{e'}} = \frac{1 + RdC3p}{1 + (Rd + R4)C3p}$$

which shows that they behave like lowpass filters having a gain value which tends at high frequencies to the ratio:

$$\frac{Rd}{Rd + R4}$$

This ratio can be adjusted by means of the variable resistance Rd and can be made close to the value 1 when the resistance Rd is much greater than the resistance R4, thereby transforming the response of a cell into an all-pass filter response for equalization on a maximum length line since the pole $-1/(Rd+R4)C3$ and the zero $-1/RdC3$ then tend to coincide.

The changeover from an all pass filter function to a low-pass filter function is obtained by moving the pole $-1/(Rd+R4)C3$ and the zero $-1/RdC3$ away from each other. Since the displacements of the pole and the zero which can be obtained for resistance and capacitance values that are usable in practice are not convenient when used in conjunction with a short line for moving said pole and said zero far enough apart to cover the entire range of useful frequencies in a single stage, the frequency range is covered by means of two successive cells, with the first cell operating on the low portion of the useful range and the second cell operating on the high portion.

Figure 3:
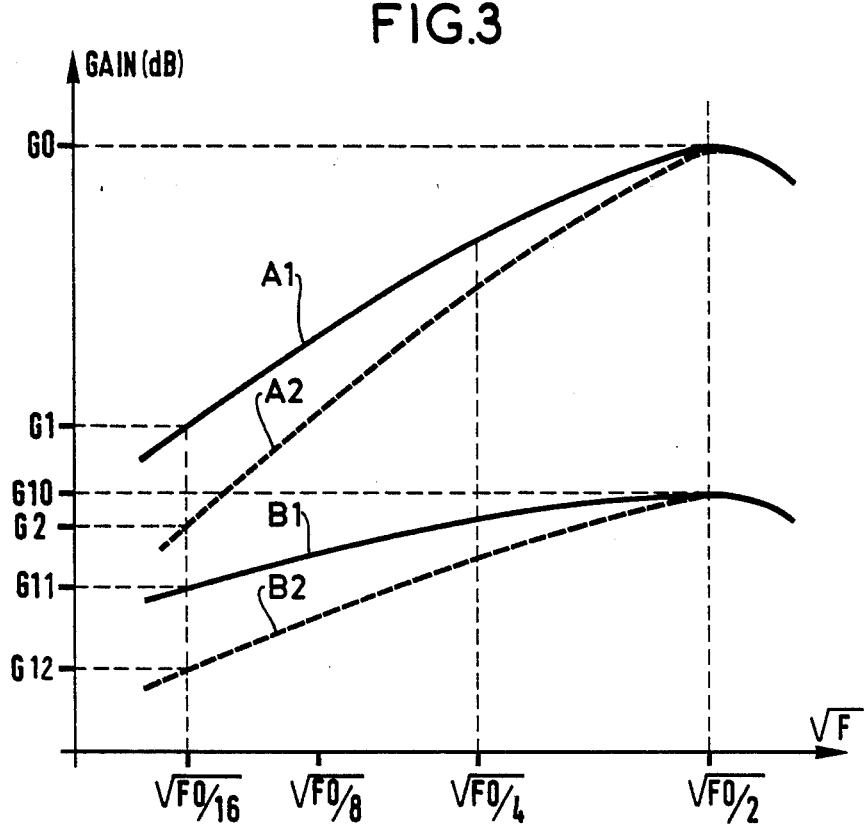
FIG. 3 is a graph showing the various gain transfer characteristic shapes which can be obtained using the variable equalizer network and the variable cable length build out (i.e. compensating) filter shown in FIG. 2.

The behavior of the variable equalization network 1 used in conjunction with the variable length build out filter 2 as a function of the values to which the resistances R1, Rd, and Rd' are adjusted is illustrated in FIG. 3 by families of curves, and each of which represents changes in the shape of the gain transfer characteristic as a function of frequency that can be obtained for fixed values for the resistances Rd and Rd', and for varying values of resistance R1. In each family, i.e., A1 and A2 or B1 and B2, the gain characteristic (G1, G2, G11 and G12 for curves A1, A2, B1 and B2, respectively) remains substantially linear as a function of the square root of frequency over a range whose high end is set by $\sqrt{F0/2}$, which corresponds to a frequency range whose high end is set by the half Baud frequency F0/2. As shown in FIG. 3, each family of curves (A1 and A2 or B1 and B2) passes through a fixed point corresponding to gain G0 or G10 at a vertical line corresponding to $\sqrt{F0/2}$, which corresponds to the half baud frequency F0/2, where F0 is the Baud frequency.

Varying the resistances Rd and Rd' while keeping the resistance R1 fixed passes from one family to the other, e.g. from A1 to B1 or from A2 to B2, i.e. causes the gain at the half Baud frequency F0/2 to vary and consequently varies the attenuation of the peak amplitude of the digital signal.

The variable resistances Rd and Rd' which serve to vary the gain at the half Baud frequency are controlled by the servo-control loop which provides automatic gain control. This loop is constituted by a peak detector 4 (FIG. 1) which is connected to the output from the length build out filter 2 and which causes the resistances Rd and Rd' to vary in the opposite direction to the detected variation in the peak amplitude.

The length build out filter 2 and the peak detector 4 are implemented in the form of a specialized automatic line build out (ALBO) integrated circuit, such as the circuit referenced TCM 2203 by Texas Instruments Corporation, which circuit includes the variable resistances Rd and Rd', the peak detector circuit 4 for controlling them, the amplifier 20 interposed between the two cells of the length complementing filter 2, together with a clock recovery circuit 5 and a bipolar binary decoder 3 placed downstream from the filter and used in the second servo-control loop which adjusts the resistance R1 for shaping the frequency spectrum.

The clock recovery circuit 5 may be an oscillator oscillating at the Baud frequency and synchronized by the pulses in the bipolar signal s(t) which are available at the output from the length complementing filter 2.

The bipolar-binary decoder 3 splits the positive and negative pulses in the bipolar signal s(t) into two sequences of binary pulses D+ and D− suitable for circuits which process binary logic, and it may be constituted by two threshold comparators, one having its threshold adjusted to one half of the level of positive pulses and triggering whenever its threshold is exceeded, and the other having its threshold adjusted to one half the level of negative pulses and triggering whenever its threshold is not exceeded.

The second servo-control loop for shaping the frequency spectrum of the received signal by varying the resistance R1 in the variable equalization network 1 tends to cause the trains of pulses which appear in the received and equalized bipolar signal to have their zero crossings in the middles of the Baud intervals, which is the condition that must be satisfied for each of the received signal pulses considered on its own to ensure that they do not interfere with one another in the middle of the Baud interval, and thus for the signal to be equalized.

Figure 4:
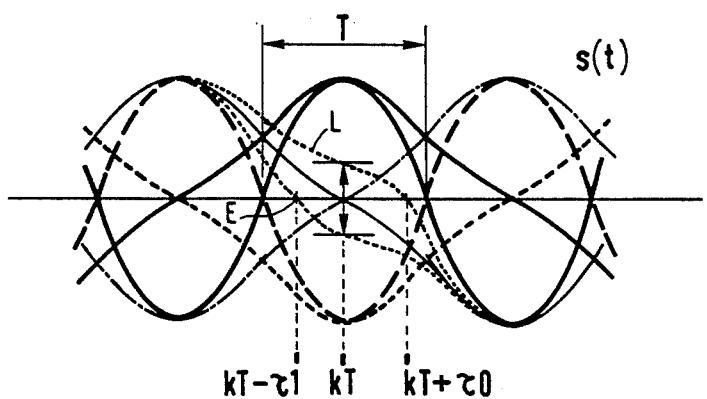
FIG. 4 is a diagram of a bipolar encoded digital transmission signal and showing examples of distortion.

As shown by the diagram of FIG. 4, a received and equalized bipolar signal normally passes through zero in the middle of an empty Baud period having no pulse and following a Baud period occupied by a pulse, at an instant marked kT, with the empty Baud interval then being occupied solely by the skirts of the pulse in the preceding Baud interval. For an empty Baud interval preceded by a Baud interval occupied by a pulse of positive polarity, the zero crossing will be as shown by the thin solid line in FIG. 4 which crosses zero at time kT. For an empty Baud interval preceded by a Baud interval occupied by a pulse of negative polarity, the zero crossing will be as shown by the one-dot chain line in FIG. 4 which also crosses zero at time kT. However, the zero crossing may happen early or late as shown by the dotted line curves E and L, respectively, in FIG. 4. An early zero crossing occurs at the time, marked $\tau 1$ relative to said middle, if there are too many high frequency components. A late zero crossing occurs at the time marked $\tau 0$, if there are too many low frequency components. Early and late zero crossings for the case of an empty Baud interval preceded by a Baud interval occupied by a pulse of a negative polarity will be easily understood from this illustration, but are not themselves illustrated to avoid excessive clutter in the Figure.

The second servo-control loop comprises a mean phase error detector 6 (FIG. 1) for detecting errors in the zero crossings of the pulse skirts and either causing the resistance R1 in the variable equalization network 1 to increase, thereby increasing the slope of the gain transfer curve of said network when the detected mean phase error is late due to an excess of low frequency components compared with the high frequency components, or else causing the resistance R1 to be reduced in the opposite case.

The mean phase error detection circuit 6 proceeds by sampling the bipolar signal s(t) in the middles of the Baud intervals occupied by the skirt of a pulse and in previously inverting or not inverting the bipolar signal s(t) as a function of the polarity of the pulses so as to obtain, both for positive pulses and for negative pulses, a sample having the same polarity for a phase error of the same sign. It comprises a selector circuit 7 for identifying Baud intervals which are occupied by pulse skirts, a sampling pulse generator circuit 8 for generating pulses in the middles of identified Baud intervals and under the control both of the clock recovery circuit 5 and of the selector circuit 7, two sampling circuits 61 and 62 controlled by the sampling pulse generator circuit 8, with one operating on the bipolar signal s(t) and the other operating on an inverted version of the signal s(t), and a summing and integrating circuit 63 operating on the samples delivered by the sampling circuits 61 and 62 and controlling a device for varying the resistance R1 in the variable equalization network, which device may be a light emitting diode (LED) in a photocoupler whose resistance varies as a function of the emitted light.

The selector circuit 7 has an input OR gate 70 having two inputs connected respectively to the D+ and D− outputs of the decoder 3, and two delay circuits 71 and 72 each providing a delay of one Baud interval T, with the two delay circuits having their inputs respectively connected to receive the D+ and the D− outputs from the decoder 30. Each of the delay circuits has its output connected via a respective inverter 73 or 74 to one of the inputs of a respective two input logic NOR gate 75 or 76 whose other input is connected in each case to the output from the OR gate 70.

The OR gate 70 delivers an output signal in the form of a sequence of pulses $D^+(T_n)+D^-(T_n)$, where $T_n$ is the current Baud interval, said signal being due to performing the OR function on the pulses available at the outputs D+ and D− of the decoder 3. This signal is used for selecting those Baud intervals in the bipolar signal s(t) which are empty of any pulse.

The delay circuit 71 delivers the sequence of pulses $D^-(T_n-1)$ which enable Baud intervals immediately preceding the current Baud interval and which are occupied by a negative pulse in the bipolar signal s(t) to be identified.

The delay circuit 72 delivers the sequence of pulses $D^+(T_n-1)$ which enable Baud intervals immediately preceding the current Baud interval and which are occupied by a positive pulse in the bipolar signal s(t) to be identified.

The logic NOR gate 75 delivers the logic signal $\overline{D^-(T_n-1).D^+(T_n)+D^-(T_n)}$ which is a selection of negative pulses from the bipolar signal s(t) immediately preceding a current Baud interval which is empty.

The logic NOR gate 76 delivers the logic signal $\overline{D^+(T_n-1).D^+(T_n)+D^-(T_n)}$ which is a selection of positive pulses from the bipolar signal s(t) immediately preceding a current Baud interval which is empty.

The sampling pulse generator circuit 8 comprises two two-input AND logic gates 80 and 81 each having one input connected to the output hd from a monostable multivibrator 82 and having its other input connected to a corresponding output from the selector circuit 7, i.e. AND gate 81 has an input connected to the output of NOR gate 75, while AND gate 80 has an input connected to the output of NOR gate 76.

The monostable multivibrator 82 is triggered by the transitions in the signal from the clock recovery circuit 5, which transitions occur in the middles of the Baud intervals, and in response it generates a calibrated duration sampling pulse at the middle of each Baud interval, which pulse is sufficiently narrow to ensure that it always overlaps the D+ and D− pulses generated by the decoder 13.

The AND gates 80 and 81 which receive a sampling pulse in the middle of each Baud interval, only allow said pulse to pass if they are simultaneously receiving a D+ or a D− pulse from the selector circuit 7, i.e. if the current Baud interval in the bipolar signal s(t) is an empty Baud interval immediately following a Baud interval which was occupied by a positive pulse or by a negative pulse.

The output from AND gate 80 which delivers a sampling pulse in the middle of a Baud interval occupied by the skirts from a positive pulse controls sampling circuit 61. This sampling circuit has its input directly connected to the output from the variable length build out filter 2, and it delivers pulses which are more positive or more negative depending on whether the phase error of the zero crossing in the pulse skirt is later or earlier relative to the middle of the Baud interval.

The output from AND gate 81 which delivers a sampling pulse in the middle of a Baud interval occupied by the skirts from a positive pulse controls sampling circuit 62. This sampling circuit has its input connected to the output from the variable length complementing filter 2, via an inverter 65 and like the above sampling circuit 61, it delivers it delivers pulses which are more positive or more negative depending on whether the phase error of the zero crossing in the pulse skirt is later or earlier relative to the middle of the Baud interval.

The outputs from the two sampling circuits 61 and 62 are combined at the input to an integrator circuit 63 which delivers a signal representative of the mean phase error for use in controlling the resistance R1 of the variable equalization network 1. The integrator circuit 63 is provided with an inhibit input under the control of an activity detector 64 which is connected to the output from the variable length build out filter 2 and ensures that the bipolar signal is of sufficient amplitude for the error rate on the D+ and D− outputs to be low prior to allowing the spectrum shaping servo-control loop to operate.

Figure 5:
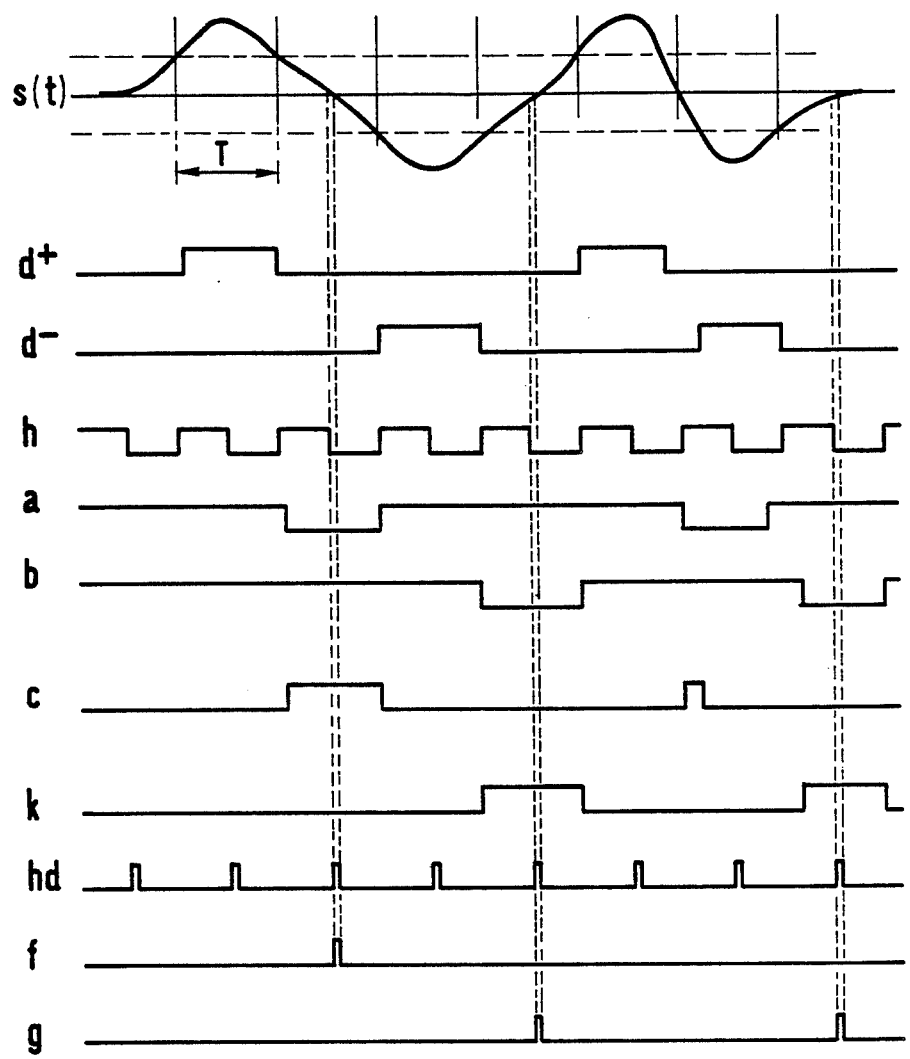
FIG. 5 is a waveform diagram for the internal signals in a mean phase error detection circuit used in the equalizer circuit shown in FIG. 1.

FIG. 5 shows waveform diagrams of the various signals at points in the mean phase error detector 6. The curve s(t) represents an equalized bipolar signal coming from the variable length build out filter 2 which encodes binary values 1010 and in which there are pulse skirts which pass through zero later than the middles of the following Baud intervals, with this degree of phase delay being representative of an excess low frequency components compared with high frequency components. Waveforms d+ and d− show the corresponding sequences of binary pulses available at the outputs D+ and D− of the bipolar-binary decoder 3. Waveform h is the clock signal at the Baud frequency generated by the clock recover circuit 5. Waveform a represents the signal at the output from inverter 74 which is the signal shown at d+ after being delayed by one Baud interval and complemented. Waveform b shows the signal at the output from inverter 73 which is the signal shown at d− after being delayed by one Baud interval and complemented. Waveform c is the output signal from NOR gate 76 which corresponds to selecting the pulses available at output D+ of the bipolar-binary decoder 3 when said pulses are followed by an empty Baud interval. Waveform k is the output signal from NOR gate 75 which constitutes selecting the pulses available at the output D− of the bipolar-binary decoder 3 when they are followed by an empty Baud interval. Interference pulses may appear in waveforms c and k because of the variations in the widths of the pulses at the outputs D+ and D− of the bipolar-binary decoder 3, however these "glitches" have no effect because they are a long way from the middle regions of the Baud intervals. Waveform hd represents a sequence of sample pulses in the middles of Baud intervals as made available at the output from monostable multivibrator 82. Waveform f shows the sampling pulses selected at the output from AND gate 80 as they appear each time the current Baud interval is itself empty and is immediately preceded by a Baud interval occupied by a positive pulse. Waveform g represents the sampling pulses selected at the output from AND gate 81 which appear during each current Baud interval which is itself empty and which is immediately preceded by a Baud interval occupied by a negative pulse.

Other embodiments of the mean phase error detector circuit 6 could be envisaged. The one Baud interval time delays of the delay circuits 71 and 72 are not critical and may be raised to as much as one and a half Baud intervals, in which case they can be constituted by two-stage shift registers clocked by the edges in the clock signal which coincide with the middles of the Baud intervals. Since the bipolar signal is a signal which is scrambled specifically for the purpose of allowing the clock to be recovered without difficulty, it is possible to omit one or other of the sampling circuits and the chain of components controlled thereby. This has the effect of causing the servocontrol loop which shapes the frequency spectrum to be controlled solely on the basis of the skirts of positive pulses or negative pulses as the case may be. Although performance is degraded, it remains acceptable.

I claim:

1. An automatic equalizer for synchronous digital transmission, said equalizer having an input for receiving a digital transmission signal occupying a frequency range including a Baud frequency and a half Baud frequency and having an output for providing an equalized digital transmission signal having a peak amplitude, said equalized digital transmission signal characterized by a succession of Baud intervals some of which are occupied by pulses and others of which are empty of pulses, with at least some of the Baud intervals which are empty of pulses being occupied by pulse skirts having zero crossings nominally appearing at middles of said Baud intervals occupied by pulse skirts, said equalizer comprising:

a variable equalization network having a network input coupled to said equalizer input for receiving said digital transmission signal and a network output coupled to said equalizer output for providing said equalized digital transmission signal, said network characterized by a gain transfer characteristic with a slope over a given frequency range and being responsive to a control signal for modifying said slope of said gain transfer characteristic in said frequency range occupied by said received digital transmission signal without modifying the value of the gain at said half Baud frequency of said digital transmission signal, said variable equalization network comprising a half-T filter cell having a cell input coupled to said network input and a cell output coupled to said network output and having a first branch in series between said cell input and output and a second branch connected between said cell output and a reference level, said first branch including a variable resistance and said second branch including an oscillator circuit comprising a parallel-connected inductance and capacitance, said oscillator circuit being tuned to a frequency lying between said Baud frequency and said half Baud frequency;

mean phase error detection means having an input responsive to said equalized digital transmission signal for detecting a mean phase error in said zero crossings in the equalized digital signal relative to the middles of said Baud intervals in the equalized digital transmission signal, said detection means having an output coupled to said variable equalization network for providing said control signal to said variable equalization network to increase said slope of said gain transfer characteristic when said detection means detects a phase delay and to reduce said slope when said detection means detects a phase advance; and an automatic gain control circuit responsive to said digital transmission signal for maintaining said peak amplitude at a substantially constant value.

2. An equalizer according to claim 1, wherein the mean phase error detection means includes means responsive to said equalized digital transmission signal for inhibiting operation of said mean phase error detection means in the absence of a digital transmission signal of sufficient quality.

3. An equalizer according to claim 1, wherein the half-T filter cell of the variable equalization network further includes a capacitance connected in parallel with at least a portion of said variable resistance in said first branch.

4. An equalizer according to claim 1, wherein the half-T filter cell of the variable equalization network further includes a resistance connected in series with the inductance in said second branch.

5. An equalizer according to claim 1, wherein the mean phase error detection means comprise selection means responsive to said digital transmission signal for selecting Baud intervals in the received digital transmission signal which are not occupied by any pulse and which are immediately preceded by a preceding Baud interval occupied by a pulse, sampling means for sampling said digital transmission signal in the middles of the selected baud intervals and producing sample values, and integrator means for averaging the sample values delivered by the sampling means and for providing said control signal to the variable equalization network.

6. An equalizer according to claim 5, wherein said digital transmission signal is a bipolar signal having pulses of positive and negative polarity, wherein the selection means select Baud intervals in the received digital transmission signal which are not occupied by any pulse and which are immediately preceded by said preceding Baud intervals which are occupied by pulses of a single polarity.

7. An equalizer according to claim 5, wherein said digital transmission signal is a bipolar signal having pulses of first and second polarities, wherein the selection means separates the selected Baud intervals in accordance with the polarities of the pulses occupying said preceding Baud intervals, and wherein the sampling means comprise means for inverting said equalized digital transmission signal to obtain an inverted version of said equalized digital transmission signal, first sampling means coupled to said selection means for sampling the equalized digital transmission signal in the middles of empty Baud intervals which are not occupied by any pulse and which are immediately preceded by said preceding Baud intervals occupied by pulses of said first polarity, and second sampling means coupled to said selection means for sampling said inverted version of the equalized digital transmission signal in the middles of Baud intervals which are not occupied by any pulse and which are immediately preceded by said preceding Baud intervals occupied by pulses of said second polarity.

* * * * *